United States Patent
Aranovich

[19]

[11] Patent Number: 6,104,168
[45] Date of Patent: Aug. 15, 2000

[54] LOW LEAKAGE LOW DROPOUT TRANSISTOR CHARGING CIRCUIT

[75] Inventor: Eugene Aranovich, Middletown, N.J.

[73] Assignee: Lucent Technologies Inc., Murray Hill, N.J.

[21] Appl. No.: 09/131,244

[22] Filed: Aug. 7, 1998

Related U.S. Application Data

[60] Provisional application No. 60/093,254, Jul. 17, 1998.

[51] Int. Cl.[7] ................................ H02J 7/00; H02H 3/18
[52] U.S. Cl. ........................ 320/136; 320/137; 320/112; 323/277; 361/82; 361/84
[58] Field of Search ..................................... 320/112, 116, 320/126, 127, 137, 163; 323/277, 278; 361/82, 84, 18

[56] References Cited

U.S. PATENT DOCUMENTS

| | | | |
|---|---|---|---|
| 4,857,985 | 8/1989 | Miller | 307/127 |
| 5,764,465 | 6/1998 | Mattes et al. | 361/77 |
| 5,835,989 | 10/1998 | Nagai | 307/116 |
| 5,917,336 | 6/1999 | Smith et al. | 326/30 |

*Primary Examiner*—Peter S. Wong
*Assistant Examiner*—Gregory J. Toatley, Jr.

[57] ABSTRACT

A charging circuit for charging a battery is disclosed. The charging circuit includes a power transistor having a charging terminal for connection to a charger, and a battery terminal for connection to the battery. Further, the charging circuit includes a shunt transistor connected between the battery and a control terminal of the power transistor. The shunt transistor prevents saturation of the power transistor when the charging source is disconnected from the charging terminal and the battery is in a charged state. This prevents leakage of current from the battery through the power transistor. The charging circuit further includes a diode connected between the charging terminal and a shunt control input of the shunt transistor. The diode, along with a voltage divider which divides the charging voltage, maintains the shunt transistor in a non-conductive state when the charger is connected to the charging terminal. When the charger is connected to the charging terminal, a controller turns on the power transistor through a control transistor.

20 Claims, 2 Drawing Sheets

6,104,168

LOW LEAKAGE LOW DROPOUT TRANSISTOR CHARGING CIRCUIT

This application claims benefit of provisional application 60/093,254 filed Jul. 17, 1998.

BACKGROUND OF THE INVENTION

1. Field of the Invention

The present invention is directed to a low leakage, low dropout transistor charging circuit, and more particularly, to a charging circuit which allows efficient battery charging while reducing leakage current from the battery once the battery charger is removed.

2. Discussion of the Prior Art

Many devices, such as wireless telephones, have rechargeable batteries which are charged when needed. FIG. 1 shows a typical charging circuit 10, where a charging or power transistor $Q_p$ is provided between the battery 12 and a charging terminal 14. In particular, the emitter of the power transistor $Q_p$ is connected to the input or charging terminal 14 charging circuit 10, and the collector of the power transistor $Q_p$ is connected to the output 16 of the battery 12. A current limiting resistor $R_1$ is connected to the base of the power transistor $Q_p$. Further, a resistor $R_2$ is connected between the charging terminal 14 (or emitter) and base of the power transistor $Q_p$. In addition, a pull down resistor $R_p$ is connected between the charging terminal 14 and ground.

The battery 12 provides power to the wireless telephone which is represented by a load resistor $R_L$ connected to the battery output 16. For charging the battery 12, a charge source 18 is connected to the charging terminal 14 and the power transistor $Q_p$ is turned ON in response to a signal from a controller 20, which is a digital signal processor (DSP) or microprocessor, for example.

In particular, the controller 20 is connected to the base of a control transistor $Q_c$ through a control base resistor $R_3$. Illustratively, the control transistor $Q_c$ is an NPN bipolar transistor and the power transistor $Q_p$ is a PNP bipolar transistor. For proper biasing, another resistor $R_4$ is connected between the base of the control transistor $Q_c$ and ground. The collector of the control transistor $Q_c$ is connected to the base of the power transistor $Q_p$ through the current limiting resistor $R_1$. Further, the emitter of the control transistor $Q_c$ is connected to ground.

In the active or charge mode where the charger 18 is connected to the charging terminal 14 for charging the battery 12, e.g., when the wireless telephone is placed in its cradle for charging, the micro-controller 20 must provide a signal to turn ON the control transistor $Q_c$. Thus, it is necessary to detect when the charger 18 is connected to the charging terminal 14.

The PNP power transistor $Q_p$ turns ON when its emitter-base junction is forward biased, i.e, when its emitter voltage is greater than its base voltage. This condition occurs when the charger 18 is connected to the charging terminal 14 to provide a positive charging voltage, and when the base of the power transistor $Q_p$ is grounded through the current limiting resistor $R_1$ and the ON control transistor $Q_c$. For example, the power transistor $Q_p$ in ON when the emitter voltage is 0.5–0.7 volts more than the base voltage, where 0.5–0.7 volts is the voltage drop across the emitter to base junction. The ON power transistor $Q_p$ allows a charging current $I_c$ to pass from the charger 18 to the battery 12 for charging thereof.

One problem with the conventional charging circuit 10 is back current leakage from the battery output 16 to ground, through the collector-base (C-B) junction of the power transistor $Q_p$ when the charger 18 is not connected to the charging terminal 14, referred to as the idle mode.

In the idle mode, the C-B junction of the power transistor $Q_p$ is forward biased by the battery voltage. The C-B or leakage current $I_L$ flows through the current limiting resistor $R_1$ if the control transistor $Q_c$, is ON and saturated. In addition, the C-B or leakage current $I_L$ also flows through resistor $R_2$, and the pull-down resistor $R_p$ to the ground. The C-B forward bias current, also shown in FIG. 1 as the leakage current $I_L$, brings the power transistor $Q_p$ to the saturation mode.

In the saturation mode, the voltage drop across C-E of the power transistor $Q_p$ becomes approximately 0.1 V, and thus the battery voltage is effectively applied to the charging terminal 14. Therefore, the leakage current $I_L$ is defined by the current through the pull-down resistor $R_p$. The pull-down resistor $R_p$ is provided to pull down the voltage of the charging terminal 14 when the charger 18 is disconnected therefrom.

If the control transistor $Q_c$ is ON, then in addition to the current leakage through the pull-down resistor $R_p$, there is further leakage current through the C-E of ON control transistor $Q_c$ to ground. Due to the need to have a relatively small current limiting resistor $R_1$, the additional leakage current through the current limiting resistor $R_1$, when the control transistor $Q_c$ is ON, is relatively large, thus accelerating the premature discharge of the battery 12.

In addition to the premature battery discharge, another disadvantage of the conventional charging circuit 10 is the inability to detect whether the charger 18 is connected to the charging terminal 14. Knowledge of whether the charger 18 is connected to the battery is needed by the controller 20 for proper operations and power management.

Detection of a low voltage at the charging terminal 14 indicates the charger 18 is disconnected therefrom. That is, the presence or absence of the charger 18 is determined by measuring the voltage at the charging terminal 14. A high voltage indicates that the charger 18 is connected to the charging terminal 14, and a low voltage indicates that the charger 18 is disconnected from the charging terminal 14, e.g., the phone $R_L$ is not on its charging cradle 18. However, because of the saturation effect of the power transistor $Q_p$, the emitter voltage of the power transistor $Q_p$ is approximately equal to its collector voltage, namely, the battery voltage. Due to the saturation of the power transistor $Q_p$ resulting in nearly equal emitter and collector voltages, where the collector voltage is the battery voltage, the voltage at the charging terminal 14 remains high even when the charger 18 is disconnected. Thus, in the conventional charging circuit 10, it cannot be determined whether the charger 18 is connected to or disconnected from the charging terminal 14.

FIG. 2 shows a second conventional charging circuit 50 where a diode $D_1$ is connected in series between the collector of the power transistor $Q_p$ and the battery output 16. The diode $D_1$ prevents flow of the leakage current, shown in FIG. 1 as $I_L$, from the battery 12 to ground through the C-B junction of the power transistor $Q_p$. The second conventional charging circuit 50 is identical to the conventional charging circuit 10 shown in FIG. 1 except for the diode $D_1$. The leakage current $I_L$ (FIG. 1) from the battery 12 to the diode $D_1$ does not flow because the diode $D_1$ is reversed biased, and thus OFF, when the charger 18 is disconnected from the charging terminal 14.

When the charger 18 is connected to the charging terminal 14, the diode $D_1$ allows battery charging. This is due to the diode $D_1$ being forward biased, and thus ON, since typically the charger voltage is at least 0.8 volts greater than the battery voltage, where 0.8 volts is the voltage drop across the diode $D_1$ and the E-C voltage drop of the saturated power transistor $Q_p$ is approximately 0.15 V. The ON diode $D_1$ allows flow of the charging current $I_c$ from the charger 18 to the battery 12 for charging thereof.

Further, when the charger 18 is disconnected from the charging terminal 14, the voltage at the charging terminal 14 is zero due to the ground connection through the pull down resistor $R_p$. The voltage at the charging terminal 14 is reduced to zero because the charging terminal 14 is open, and there is no leakage current $I_L$ (FIG. 1) flowing through the collector to base (C-B) junction of the power transistor $Q_p$. The absence of the leakage current $I_L$ prevents saturation of the power transistor $Q_p$ which prevents nearly shorting its emitter to its collector. The open power transistor $Q_p$ prevents connection of its emitter to the battery 12, resulting in a zero emitter voltage due to the pull-down resistor $R_p$ and the open emitter of the OFF power transistor $Q_p$.

Although adding the diode $D_1$ prevents premature battery discharge and allows detection of the charger 18 being connected to the charging terminal 14, the diode $D_1$ has several disadvantages. In particular, the diode $D_1$ is expensive and large, thus increasing cost, consuming valuable real estate, and preventing miniaturization. Further, the diode $D_1$ has a voltage drop of approximately 0.8 volts, thus increasing the required charging voltage by approximately 0.8 volts and consuming high power, such as approximately 0.56 (0.8 v×0.7 A) watts for a charging current $I_c$ of approximately 700 mA. The increased power dissipation generates unwanted heat which is often detrimental to the proper operations of devices connected to the output 16 of the conventional charging circuit 50, such as a wireless telephone which includes temperature sensitive circuits or components like clock oscillators.

Accordingly, there is a need for a charging circuit which prevents leakage current, allows detection of connection or disconnection of the charger from the battery, and minimizes power consumption and heat generation.

SUMMARY OF THE INVENTION

The object of the present invention is to provide a charging circuit which eliminates the problems of conventional charging circuits.

Another object of the present invention is to provide a charging circuit which reduces leakage current and power consumption.

A further object of the present invention is to provide a charging circuit which allows detection of connection or disconnection of a charger from a rechargeable battery.

A still further object of the present invention is to provide a charging circuit which generates minimal heat and has a small size.

The present invention accomplishes the above and other objects by providing a charging circuit for charging a battery. The charging circuit includes a power transistor having a charging terminal for connection to a charger, and a battery terminal for connection to the battery. Further, the charging circuit a shunt transistor connected between the battery and a control terminal of the power transistor. The shunt transistor prevents saturation of the power transistor when the charging source is disconnected from the charging terminal and the battery is in a charged state. This prevents leakage of current from the battery through the power transistor. Illustratively, the shunt transistor is bipolar transistor and is configured as a common base mode transistor.

The charging circuit further includes a diode connected between the charging terminal and a shunt control input of the shunt transistor. The diode, along with a voltage divider which divides the charging voltage, maintains the shunt transistor in a non-conductive state when the charger is connected to the charging terminal. When the charger is connected to the charging terminal, a controller turns on the power transistor through a control transistor.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
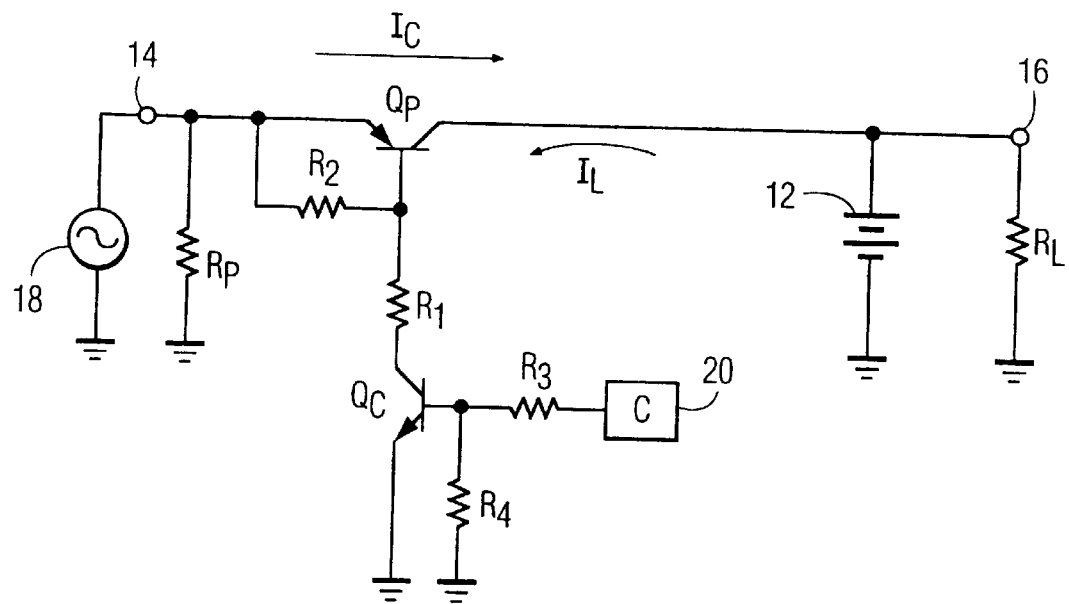
FIG. 1 shows a conventional charging circuit.
Figure 2:
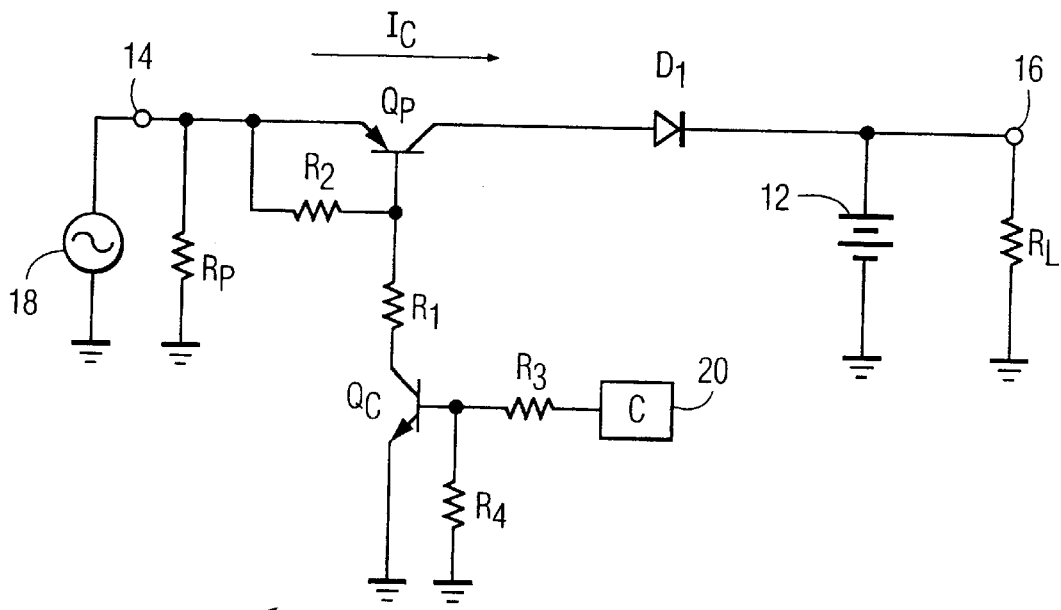
FIG. 2 shows another conventional charging circuit.
Figure 3:
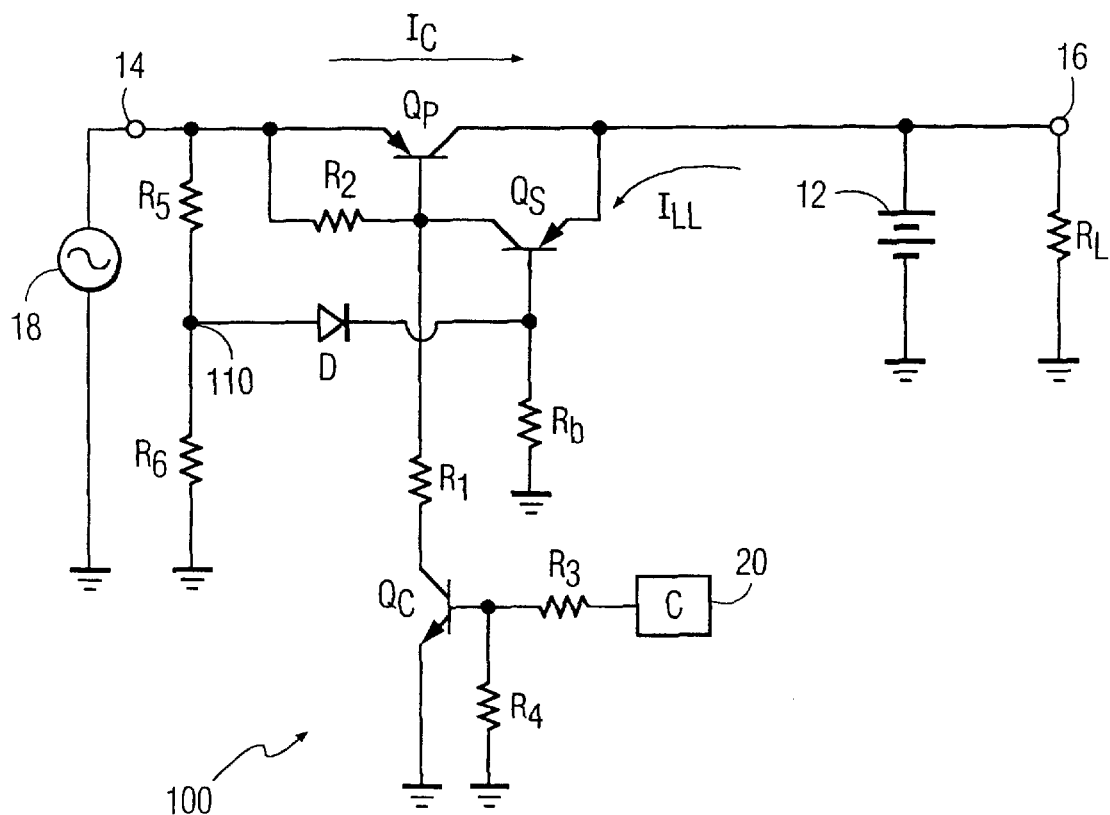
FIG. 3 shows a charging circuit according to the present invention.

FIG. 3 shows a charging circuit 100 for charging the battery 12. Similar to the conventional charging circuits 10, 50 shown in FIGS. 1 and 2, the charging circuit 100 has an input or charging terminal 14 connected to the emitter of a first or power transistor $Q_p$, such as a PNP bipolar transistor, for example. The collector of the power transistor $Q_p$, is connected to the positive or output terminal 16 of the battery 12 or the charging circuit 100. A charger 18, such as a voltage or current source, when connected to the charging terminal 14, provides a charge current $I_c$ which flows from the emitter (E) to the collector (C) of the power transistor $Q_p$ to charge the battery 12.

A second or control transistor $Q_c$, such as an NPN bipolar transistor for example, has an emitter connected to ground and a collector connected to the base of the power transistor $Q_p$ through a current limiting resistor $R_1$. A controller 20, such as a digital signal processor (DSP) or micro-processor, is connected to the base (B) of the control transistor $Q_c$ through a base resistor $R_3$. A biasing resistor $R_4$ is also connected between the base of the control transistor $Q_c$ and ground.

When the controller 20 detects presence of the charger 18, the controller 20 provides a control signal to turn ON the control transistor $Q_c$. The controller 20 detects presence of the charger 20 using detectors known in the art which measure the voltage at the input or charging terminal 14. A high input voltage at the charging terminal 14 indicates the charger 18 is connected, and a low input voltage indicates the charger 18 is disconnected. As will be explained, a diode and pull-down resistors acting as a voltage divider ensure detection of the charger and proper operation of the charging circuit 100. The ON control transistor $Q_c$ connects the base of the power transistor $Q_p$ to ground through the current limiting resistor $R_1$. When the charger 18 is connected to the charging terminal 14 and the control transistor $Q_c$ is ON, the power transistor $Q_p$ turns ON because it is a PNP transistor having an emitter voltage which is greater than its base voltage. Illustratively, this emitter voltage or voltage of the charger 18 is approximately 4.2 volts. Thus, the base voltage of the power transistor $Q_p$ is approximately 3.5 volts, due to the 0.7 volts drop of the emitter-base (E-B) junction of the power transistor $Q_p$. The emitter-to-collector (EC) drop of the ON power transistor $Q_p$ is approximately 0.2 volts, thus providing approximately 4 volts at the collector of the power transistor $Q_p$ for charging the battery 12.

The charging circuit 100 further includes a third or shunt transistor $Q_s$, such as a PNP bipolar transistor for example, having an emitter connected to the battery's positive or output terminal 16. The collector of the shunt transistor $Q_s$ is connected to the base of the power transistor $Q_p$. Further, a resistor $R_2$ is connected between the emitter and base of the power transistor $Q_p$. The base of the shunt transistor $Q_s$ is connected to ground through a base resistor $R_b$.

Two resistors $R_5$, $R_6$ are series connected between the charging terminal 14 and ground. In addition, a diode D is connected between the base of the shunt transistor $Q_s$ and a node 110 located between the two pull-down resistors $R_5$, $R_6$ which form a voltage divider. In particular, the anode of the diode D is connected to the node 110 and the cathode is connected to the base of the shunt transistor $Q_s$.

Operation of the switch or charging circuit 100 is now described. In the idle mode, the input or charging terminal 14 is floating since the charger is disconnected from the charging terminal 14, e.g., the wireless phone or hand set is out of the charging cradle. In the idle mode, the shunt transistor $Q_s$, which is configured as a common base mode, becomes saturated by the low leakage current $I_{LL}$ flowing from battery 12 to ground, through the emitter-base (E-B) junction of the shunt transistor $Q_s$ and its base resistor $R_b$. The saturated collector-emitter (C-E) of the shunt transistor $Q_s$ effectively shunts the collector-base (C-B) junction of the power transistor $Q_p$.

The C-E saturation voltage of the shunt transistor $Q_s$ is approximately 0.15 Volts (V). Thus, the shunt transistor $Q_s$ clamps the voltage drop or forward offset of the collector-base (C-B) junction of the power transistor $Q_p$ at 0.15 V. To conduct, the collector—base junction of the power transistor $Q_p$ must be approximately 0.5 V to 0.7 V forward offset.

Due to the 0.15 V level of the C-B junction of the power transistor $Q_p$, as clamped by the shunt transistor $Q_s$, the current through the collector—base junction of the power transistor $Q_p$ is negligible. Thus, the power transistor $Q_p$ does not become saturated and conductive, so no leakage current $I_L$ (FIG. 1) passes therethrough to ground. Further, the control transistor $Q_c$ is turned OFF in the idle mode by the controller 20 upon detection of the removal or disconnection of the charger 18 from the charging terminal 14. Since the power transistor $Q_p$ does not conduct in the idle mode, the pull-down resistors $R_5$, $R_6$ lower the voltage at the input or charging terminal 14 when the charger 18 is disconnected from the charging terminal 14. This is unlike the conventional charging circuit 10 (FIG. 1) having the leakage current $I_L$ which saturates the power transistor $Q_p$ and keeps the charging terminal voltage at nearly the battery output voltage level. The reduced charging terminal voltage of the charging circuit 100 allows detection of the idle mode, e.g., whether the hand set is in the cradle or out of the cradle. Upon detection of the low charging terminal voltage, the controller 20 turns OFF the control transistor $Q_c$, which turns OFF the power transistor $Q_p$. It is noteworthy that the shunt transistor $Q_s$ is turned ON only in the idle mode to prevent saturation of the power transistor $Q_p$.

With power transistor $Q_p$ turned OFF in the idle mode, the only leakage of the charging circuit 100 in the idle mode is the base current $I_{LL}$ of the shunt transistor $Q_p$ which is about 30–50 microamps. Any additional leakage through the E-C of the shunt transistor $Q_s$ to ground through the resistor $R_2$ and the pull-down resistors $R_5$ and $R_6$ is negligible because resistor $R_2$ is large. Thus, the low leakage current $I_{LL}$ primarily passes from the battery output 16 to ground through the E-B junction of the shunt transistor $Q_s$ and its base resistor $R_b$.

The following illustrative values are used for the various resistors: $R_1$=300Ω; $R_2$=100kΩ; $R_3$=10kΩ; $R_4$=100kΩ; $R_5$=1kΩ; $R_6$=15kΩ; and $R_b$=30kΩ. In addition and for illustration, the diode D and transistors $Q_p$, $Q_c$, $Q_s$ are made by Philips Electronics, where the control and shunt transistors $Q_c$, $Q_s$ are low power transistors part numbers PMBT3906 and PMBT3904, respectively; the power transistor $Q_p$ is a low dropout transistor part number BC869; and the diode D is a low power silicon diode part number PMBD914.

In the active mode where the charger 18 is connected to the charging terminal 14 for charging the battery 12, e.g., the hand set is in the cradle, the voltage divider comprising the two resistors $R_5$, $R_6$ and diode D provide reverse offset voltage for the base-to-emitter junction of the shunt transistor $Q_s$. This compensates for the forward voltage coming from the battery 12, and keeps the shunt transistor $Q_s$, in the non-conductive state. The voltage divider $R_5$, $R_6$ and diode D keep the E-B voltage drop of the shunt transistor $Q_s$ at less than the voltage necessary for turning ON this E-B junction, e.g., less than 0.5 V. Thus, the voltage divider $R_5$, $R_6$ and diode D turn OFF and keep OFF the shunt transistor $Q_s$. Being in the OFF or non-conductive state, the shunt transistor $Q_s$ does not affect the saturation voltage of the power transistor $Q_p$.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A charging circuit for charging a battery comprising:
   a charging terminal for connection to a charging source;
   a power transistor connected between said charging terminal and said battery; and
   a shunt transistor connected between said battery and a control input of said power transistor; said shunt transistor preventing leakage of current from said battery through said power transistor.

2. The charging circuit of claim 1, wherein said shunt transistor prevents saturation of said power transistor when said charging source is disconnected from said power transistor and said battery is charged.

3. The charging circuit of claim 1, wherein said shunt transistor is configured as a common base mode transistor.

4. The charging circuit of claim 1, further comprising a diode connected between said charging terminal and a shunt control input of said shunt transistor.

5. The charging circuit of claim 1, further comprising a voltage divider connected between said charging terminal and ground.

6. The charging circuit of claim 1, further comprising a device which maintains said shunt transistor in a non-conductive when said charging source is connected to said charging terminal.

7. The charging circuit of claim 6, wherein said device includes a diode connected between said charging terminal and a shunt control input of said shunt transistor.

8. The charging circuit of claim 1, further comprising a controller which turns on said power transistor when said charging source is connected to said charging terminal.

9. The charging circuit of claim 1, further comprising a control transistor which turns on said power transistor when said charging source is connected to said charging terminal.

10. A charging circuit for charging a battery comprising:
- a power transistor having a charging terminal for connection to a charging source and a battery terminal for connection to said battery; and
- a shunt transistor connected between said battery terminal and a control terminal of said power transistor; said shunt transistor preventing saturation of said power transistor when said charging source is disconnected from said charging terminal and said battery is in a charged state and connected to said battery terminal.

11. The charging circuit of claim 10, wherein said shunt transistor prevents leakage of current from said battery through said power transistor.

12. The charging circuit of claim 10, wherein said shunt transistor is configured as a common base mode transistor.

13. The charging circuit of claim 10, further comprising a device which maintains said shunt transistor in an non-conductive state when said charging source is connected to said charging terminal.

14. The charging circuit of claim 13, wherein said device includes a diode connected between said charging terminal and a shunt control input of said shunt transistor.

15. The charging circuit of claim 10, further comprising a controller which turns on said power transistor when said charging source is connected to said charging terminal.

16. The charging circuit of claim 10, further comprising a control transistor which turns on said power transistor when said charging source is connected to said charging terminal.

17. The charging circuit of claim 10, wherein said shunt transistor is a bipolar transistor.

18. A charging circuit for charging a battery comprising:
- switching means for connecting a charging means to said battery; and
- shunting means for preventing leakage of current from said battery through said switching means.

19. The charging circuit of claim 18, wherein said shunting means prevents turn-on of said switching means when said charging means is disconnected from said switching means.

20. The charging circuit of claim 18, further comprising a control means for maintaining said shunting means in an off state when said charging means is connected to said switching means.

* * * * *